(12) United States Patent
Okabe

(10) Patent No.: US 9,483,124 B2
(45) Date of Patent: Nov. 1, 2016

(54) OPERATION SWITCH AND OPERATION DEVICE

(71) Applicant: PANASONIC CORPORATION, Osaka (JP)

(72) Inventor: Shunichiro Okabe, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 46 days.

(21) Appl. No.: 14/229,258

(22) Filed: Mar. 28, 2014

(65) Prior Publication Data

US 2015/0077330 A1  Mar. 19, 2015

(30) Foreign Application Priority Data

Sep. 19, 2013  (JP) .................................. 2013-193837
Feb. 14, 2014  (JP) .................................. 2014-026139

(51) Int. Cl.
*G06F 3/023* (2006.01)
*G06F 3/02* (2006.01)
*H01H 13/7057* (2006.01)

(52) U.S. Cl.
CPC ............ *G06F 3/023* (2013.01); *G06F 3/0202* (2013.01); *G06F 3/0238* (2013.01); *H01H 13/7057* (2013.01); *H01H 2217/032* (2013.01); *H01H 2219/012* (2013.01); *H01H 2221/07* (2013.01); *H01H 2221/074* (2013.01); *H01H 2223/034* (2013.01); *H01H 2223/036* (2013.01)

(58) Field of Classification Search
CPC combination set(s) only.
See application file for complete search history.

(56) References Cited

U.S. PATENT DOCUMENTS

| | | | |
|---|---|---|---|
| 5,900,599 A * | 5/1999 | Ohashi et al. ................ 200/5 A |
| 6,437,774 B1 | 8/2002 | Tsuji et al. | |
| 2002/0056614 A1* | 5/2002 | Amari .................... B60K 35/00 | 200/5 D |
| 2007/0029172 A1* | 2/2007 | Choi ...................... G06F 1/1626 | 200/1 B |
| 2009/0057117 A1* | 3/2009 | Jang ....................... D06F 39/005 | 200/314 |
| 2013/0002557 A1* | 1/2013 | Chiang ............. H01H 13/7065 | 345/168 |

FOREIGN PATENT DOCUMENTS

JP  09-258895 A  10/1997

* cited by examiner

*Primary Examiner* — Dwayne Bost
*Assistant Examiner* — Robert Michaud
(74) *Attorney, Agent, or Firm* — McDermott Will & Emery LLP

(57) ABSTRACT

The operation device includes a display part; a partition frame member arranged on the display part, and configured to divide the display part into a plurality of display surfaces; an operation button member having transparent operation buttons arranged on the respective display surfaces, and configured to join the operation buttons by integral molding to be able to deform the operation buttons in a pressing direction at respective one sides, functioning as fulcrums, of the display surfaces; switch parts arranged under the operation button member, and pressed by pressing of the operation buttons; and an output part configured to output information indicating whether or not the switch parts are pressed.

11 Claims, 11 Drawing Sheets

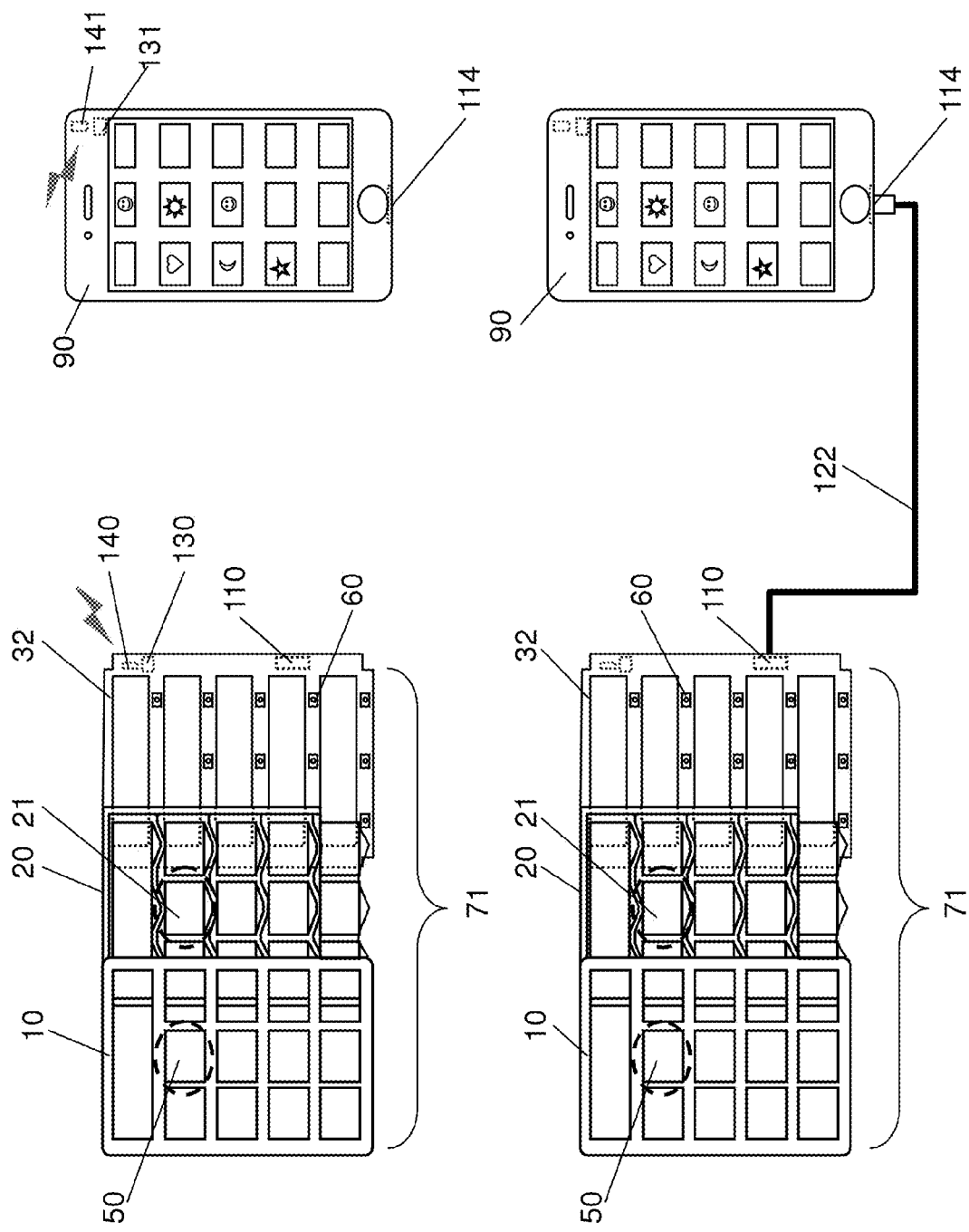

OPERATION SWITCH AND OPERATION DEVICE

RELATED APPLICATIONS

This application claim the benefit of Japanese Application No. 2013-193837, filed on Sep. 19, 2013 and Japanese Application No. 2014-026139, filed Feb. 14, 2014, the disclosures of which Applications are incorporated by reference herein.

BACKGROUND OF THE INVENTION

1. Field of the Invention

The present disclosure relates to an operation switch and an operation device that are used in operation equipment such as a video image switching device used in video image production of a broadcasting station or the like.

2. Description of the Related Art

An operation device with switches that can arbitrarily change the display contents of a plurality of push button switches is used in various operation equipment such as a video image switching device used in video image production of a broadcasting station or the like, FA equipment, and medical operation equipment. Unexamined Japanese Patent Publication No. H09-258895 discloses an operation device with switches that uses a system of superposing a touch panel and a transparent mechanical switch on a liquid crystal screen.

The transparent mechanical switch generates returning force for returning a pressed button to an original position by using a magnetic, and a click feeling or a stroke feeling at the time of the pressing of the button.

SUMMARY OF THE INVENTION

The operation device with switches disclosed in Unexamined Japanese Patent Publication No. H09-258895 has a large number of components, and therefore a large number of assembling steps are required for assembly.

An object of the present disclosure is to provide an operation switch and an operation device with switches, each of which achieves both of reduction in the number of components and the generation of a button returning force and a click feeling.

An operation device according to the present disclosure includes: a display part; a partition frame member arranged on the display part, and configured to divide the display part into a plurality of display surfaces; an operation button member having transparent operation buttons arranged on the respective display surfaces, and configured to join the operation buttons by integral molding to be able to deform the operation buttons in a pressing direction at respective one sides, functioning as fulcrums, of the display surfaces; switch parts arranged under the operation button member, and pressed by pressing of the operation buttons; and an output part configured to output information indicating whether or not the switch parts are pressed.

Additionally, the switch parts of the operation device according to the present disclosure are tactile switches.

An operation switch according to the present disclosure is an operation switch that is superposed on an information terminal having a display part, and includes: a partition frame member configured to divide the display part into a plurality of display surfaces; an operation button member having transparent operation buttons arranged on the respective display surfaces, and configured to join the operation buttons by integral molding to be able to deform the operation buttons in a pressing direction at respective one sides, functioning as fulcrums, of the display surfaces; switch parts arranged under the operation button member, and pressed by pressing of the operation buttons; and an output part configured to output information indicating whether or not the switch parts are pressed.

In the display operation device according to the present disclosure, separate buttons can be visually and tactilely recognized. Furthermore, it is possible to obtain a click feeling in the pressing operation of the button.

BRIEF DESCRIPTION OF DRAWINGS

FIG. 11A is a view showing an example of the configuration of an operation switch according to another exemplary embodiment by radio, and FIG. 11B is a view showing an example of the configuration of the operation switch according to another exemplary embodiment using a communication cable.

DETAILED DESCRIPTION OF THE PREFERRED EMBODIMENTS

Hereinafter, exemplary embodiments are described in detail suitably with reference to the drawings. However, excessively detailed description may be omitted. For example, detailed description of matters that are already well known, or redundant description for substantially the same configuration may be omitted. This is to avoid making the following description unnecessarily redundant, and to facilitate the understanding by a person skilled in the art.

The attached drawings and the following description are provided in order that a person skilled in the art sufficiently understands the present disclosure, and are not intended to limit the subject matter recited in the scope of the claims.

First Exemplary Embodiment 1-1. Configuration of Operation Device

Figure 1:
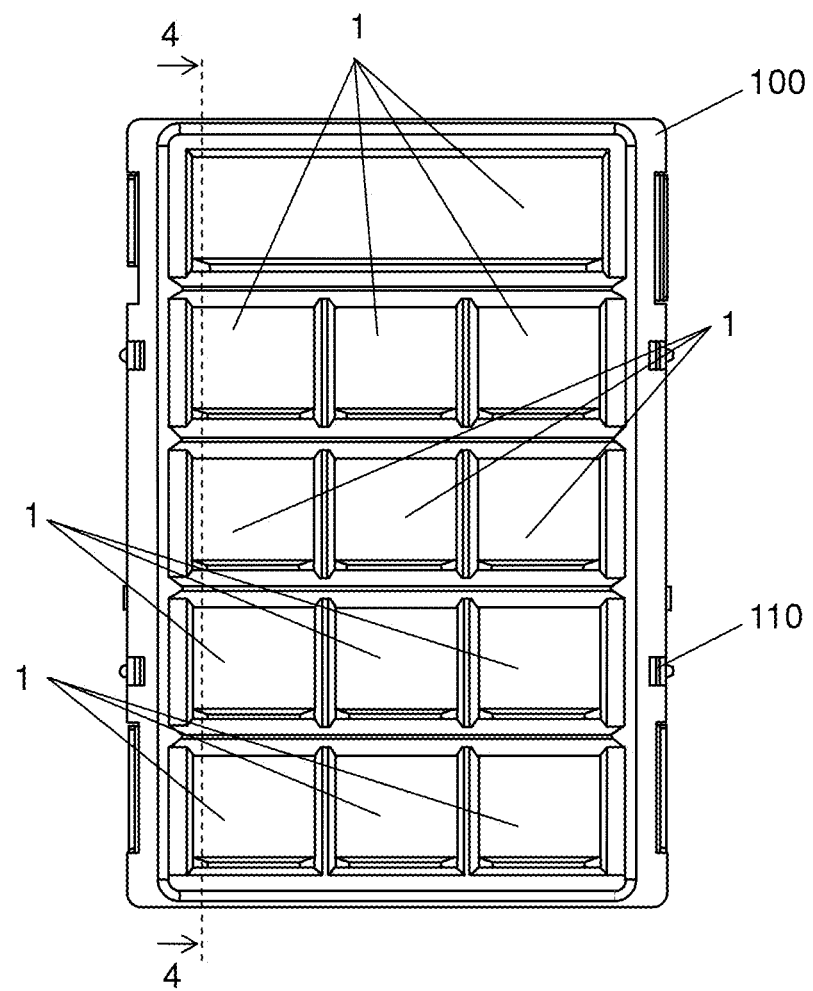
FIG. 1 is an external view of an operation device according to a first exemplary embodiment.

FIG. 1 is an external view of operation device 100 according to a first exemplary embodiment. As shown in FIG. 1, operation device 100 is configured by thirteen operable buttons 1 and communication connector 110 that is connected to the outside. Operation is performed by the pressing of buttons 1.

Figure 2:
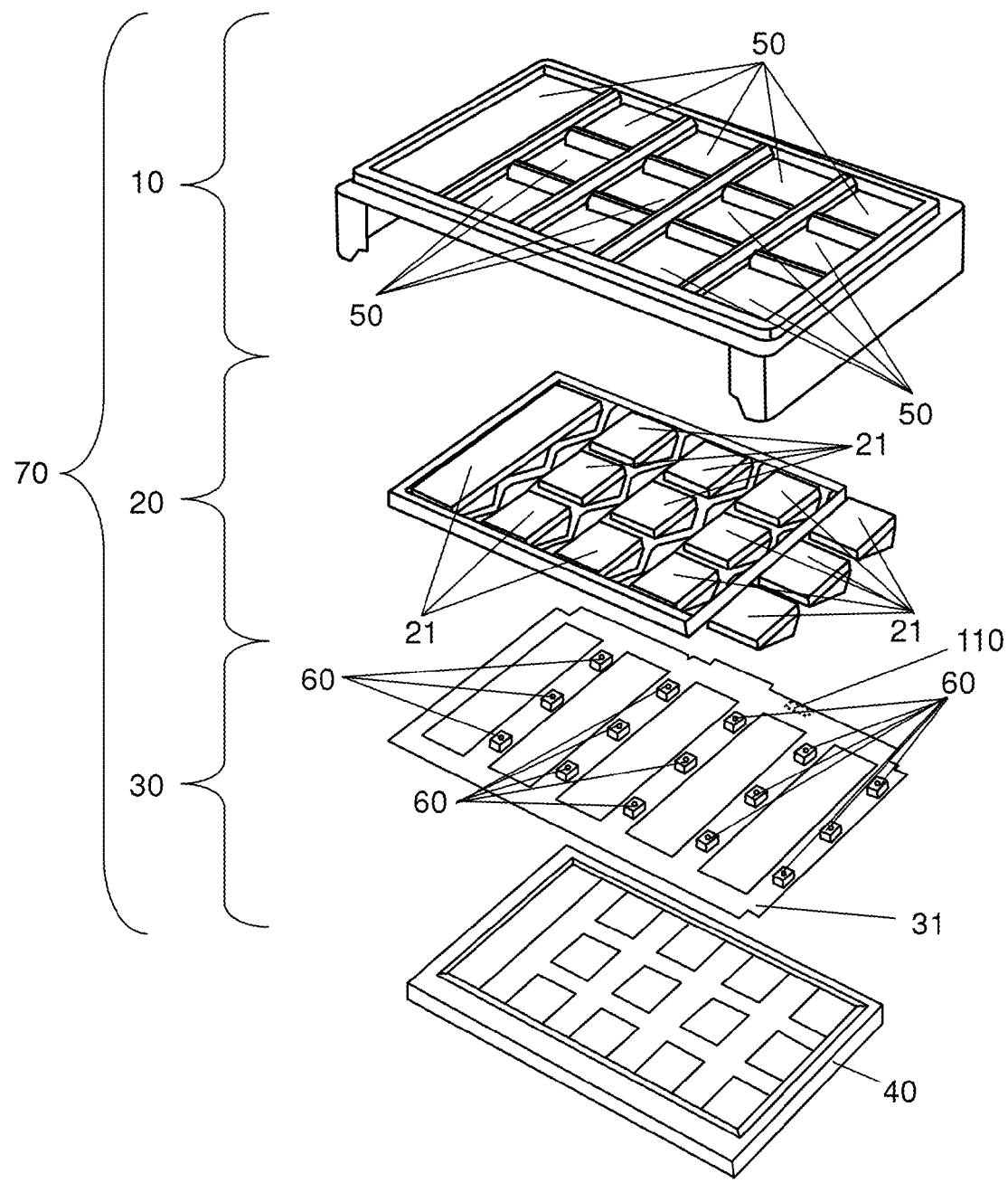
FIG. 2 is an exploded perspective view of the operation device according to the first exemplary embodiment.

FIG. 2 is an exploded perspective view of operation device 100 according to the first exemplary embodiment. As shown in FIG. 2, operation device 100 is configured by operation part 70 and display part 40 such as a liquid crystal panel.

Operation part 70 is configured by partition frame member 10, operation button member 20, and switch substrate 30. Partition frame member 10 has thirteen openings 50. Partition frame member 10 is opaque. Operation button member 20 is engaged with partition frame member 10, rectangular operation button 21 is arranged in each of thirteen openings 50. Operation button members 20 are configured by transparent resin, and have elasticity. Switch substrate 30 is engaged with operation button member 20, and has tactile switches 60 that perform electric opening/closing operation by the pressing operation of operation buttons 21, substrate 31 that electrically connects tactile switches 60, and communication connector 110 for performing transmission of electric opening/closing operation information between tactile switches 60 and the outside.

Display part 40 has a display surface that is visible from each of openings 50 of partition frame member 10, and each display surface displays predetermined information.

Figure 3:
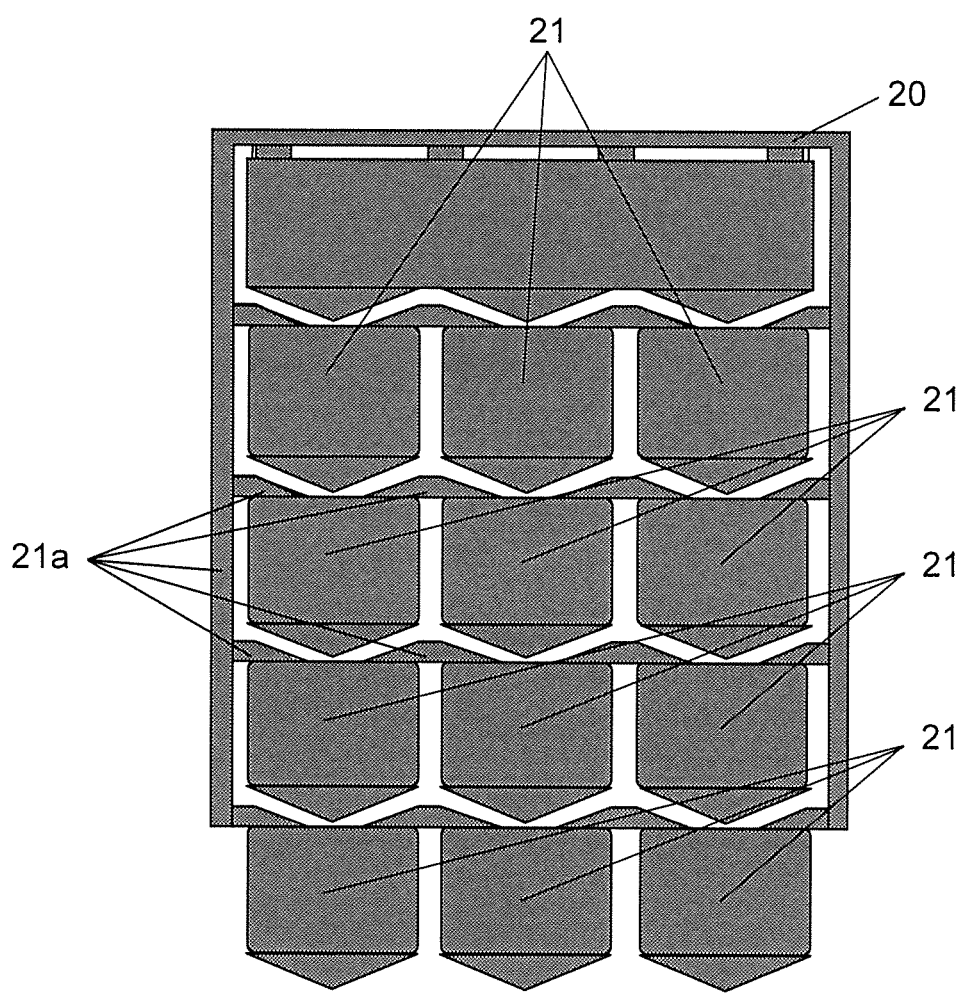
FIG. 3 is a view for illustrating an operation button member according to the first exemplary embodiment.

FIG. 3 is a view showing only extracted operation button member 20 of operation device 100. In the drawing, the operation button member is integrally formed, and is separated on void parts. Therefore, the upper sides of operation buttons 21 are fixed to support portions 21a and the lower sides thereof are not fixed to support portions 21a. Accordingly, when operation buttons 21 are pressed, operation buttons 21 are deformable in a pressing direction with the upper sides of the display surfaces as fulcrums, and can be pressed individually.

Figure 4A:
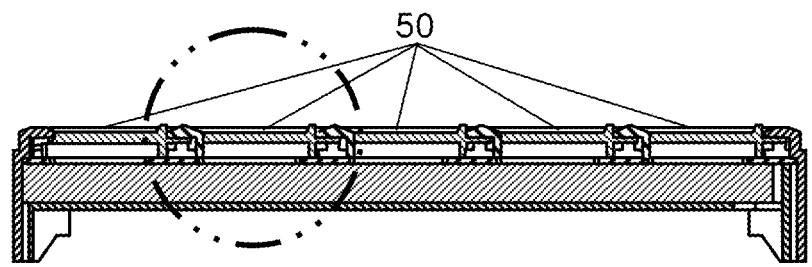
FIG. 4A is a sectional view taken along the 4-4 line of a plan view of operation device in FIG. 1.
Figure 4B:
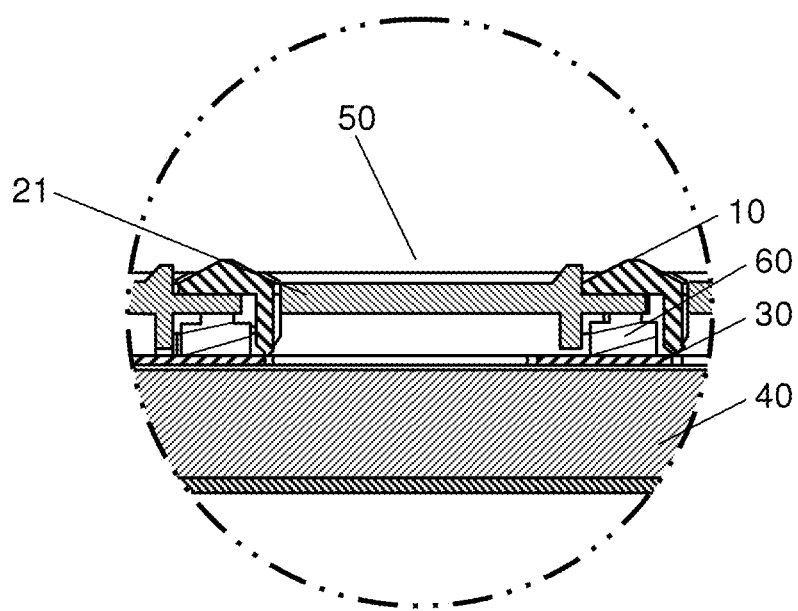
FIG. 4B is an enlarged sectional view of a part of FIG. 4A.

FIG. 4A is a sectional view taken along the 4-4 line of operation device 100 in FIG. 1. Five openings 50 are arranged. FIG. 4B is an enlarged sectional view of one of openings 50 in the sectional view of FIG. 4A. One operation button 21, and one tactile switch 60 are arranged with respect to one opening 50.

Thus, operation device 100 has operation buttons 21 that are arranged in openings 50 definitely separated visually and tactilely, by the provision of opaque partition frame member 10 on display part 40.

A plurality of tactile switches 60 may be arranged with respect to one operation button 21 which corresponds to one opening 50, by the utilization of elasticity that operation button 21 has. In this case, tactile switches 60 that electrically perform opening/closing operation may be arranged at pressed positions such as the right ends and the left ends of operation buttons 21.

1-2. Operation of Operation Device

Figure 5A:
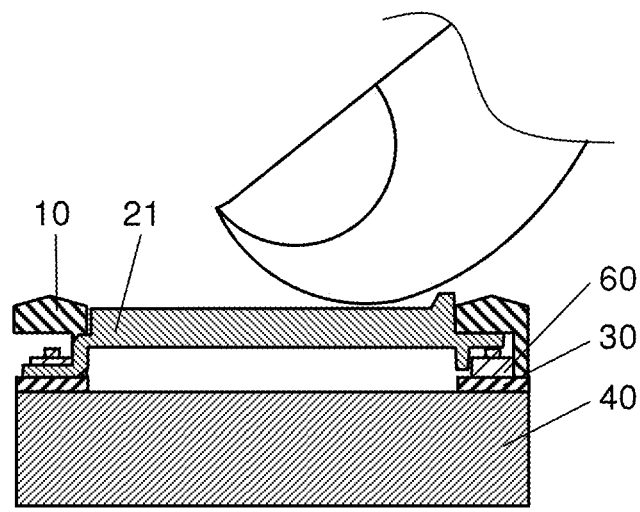
FIG. 5A is a view for illustrating the pressing of an operation button according to the first exemplary embodiment and shows an unpressed state.
Figure 5B:
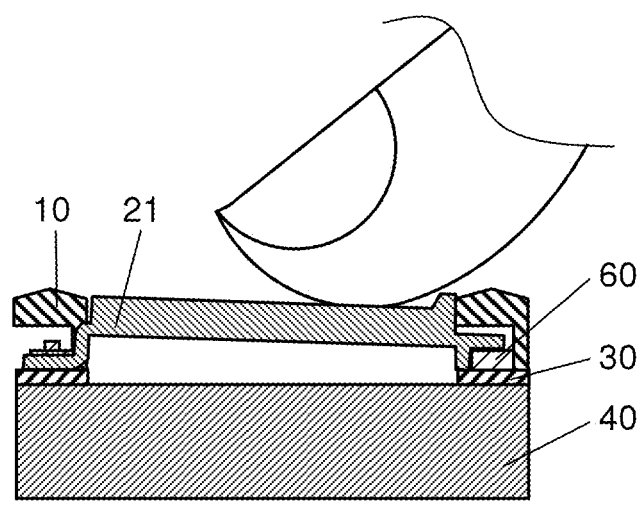
FIG. 5B is a view showing a pressed state.

The pressing operation of operation buttons 21 of operation device 100 is described with reference to FIGS. 5A and 5B. FIGS. 5A and 5B each are a view for illustrating the pressing of operation button 21 of operation device 100. Operation button 21 is the same as operation button 21 in the sectional view of FIG. 4B. FIG. 5A shows a state before a user presses operation button 21 with his finger, and FIG. 5B shows a state where the user presses operation button 21 with his finger.

As shown in FIG. 5A, before the user presses operation buttons 21, tactile switch 60 is electrically opened. As shown in FIG. 5B, when the user presses operation button 21, operation button 21 is warped to press tactile switch 60. Tactile switch 60 is brought into an electrically closed state. When tactile switch 60 is brought into the closed state, tactile switch 60 is electrically connected to substrate 31. Then, the information indicating that tactile switch 60 is electrically closed is output to the outside via communication connector 110.

When the user presses operation button 21, and tactile switch 60 is brought into the electrically closed state, the user obtains a key stroke caused by the pressing of operation button 21, and obtains a click feeling that results in the recognition of pressing of the switch.

Then, when the user releases his finger from operation button 21, operation button 21 returns to a state before operation button 21 is pressed as shown in FIG. 5A, with repulsion force by elasticity that operation button 21 has.

1-3. Effects of Operation Device

As described above, operation device 100 of this exemplary embodiment has the following characteristics.
(1) The operation buttons can be visually and tactilely recognized as separate operation buttons 21 by the separation with the frame of opaque partition frame member 10 on the display surface.
(2) Tactile switches 60 or switch substrate 30 can be concealed on the back of the frame by the separation with opaque partition frame member 10 on the display surface.
(3) A plurality of operation buttons 21 and operation button member 20 can be integrated with resin.
(4) The elasticity of the resin of operation button member 20 can be utilized for returning force at the time of the pressing of a button, and therefore returning means such as a spring can be omitted.
(5) The display of display part 40 can be switched with a click feeling by the pressing operation of operation buttons 21.
(6) The number of components and the number of assembling steps can be reduced compared to conventional technologies.

2. Operation of Video Image Switching Device

Figure 6:
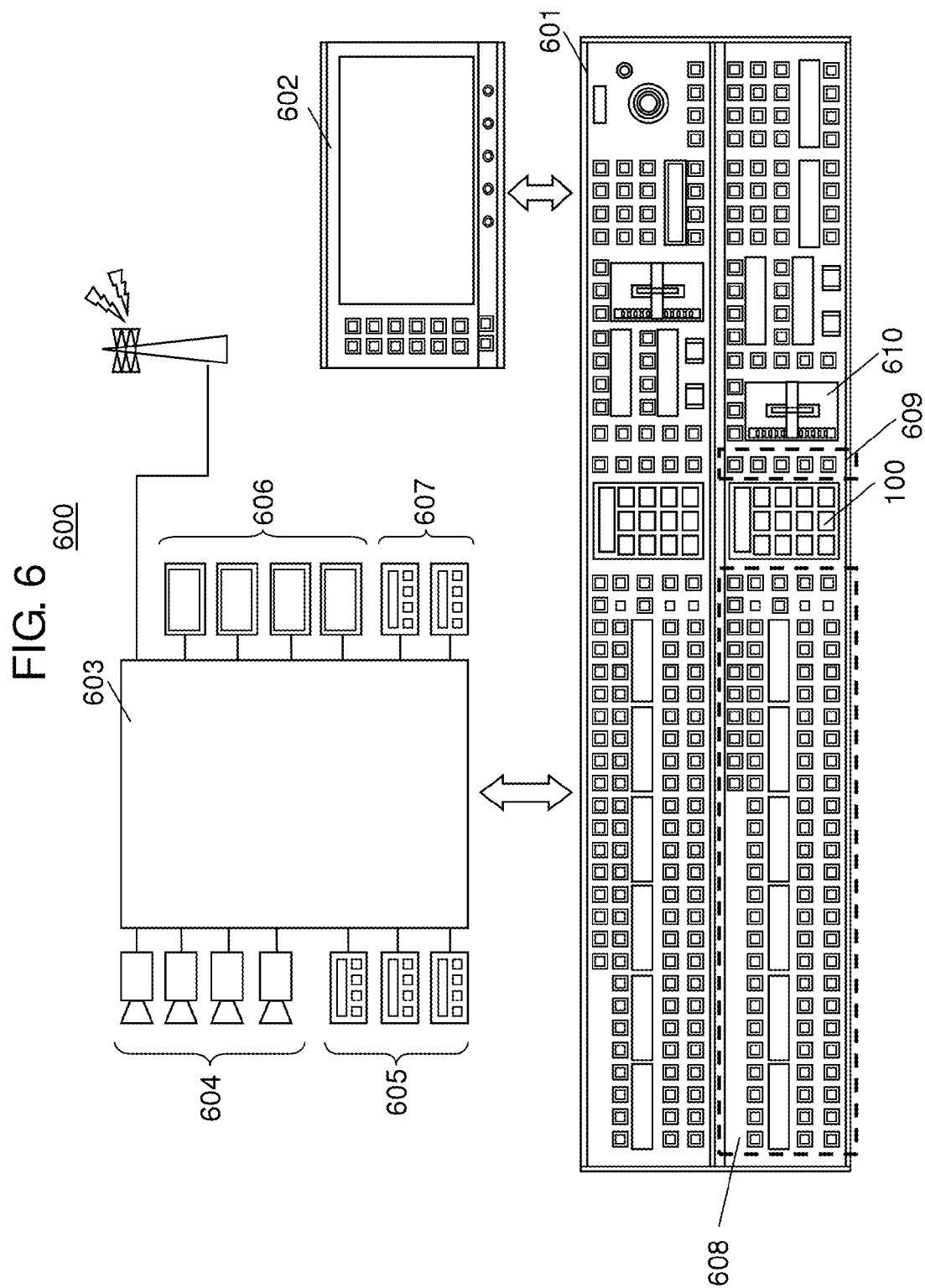
FIG. 6 is a view showing a video image switching system according to the first exemplary embodiment.

Operation at the time of the use of operation device 100 in a video image switching device is now described. FIG. 6 is a view for illustrating video image switching system 600. Video image switching system 600 is configured by video image switching operation part 601 that selects a video image to be broadcast, video image switching setter 602 that sets the details of an video image effect, video image selection processor 603 that processes a video image by the operation of video image switching operation part 601, a plurality of cameras 604 that photograph video images, a plurality of VTRs (Video Tape Recorders) for reproduction 605 that record video images, a plurality of monitors for confirmation 606 that confirm the photographed video images or the recorded video images, and a plurality of VTRs 607 that record the photographed video images or edited video images.

The video image switching operation part 601 has at least video image operation part 608, effect content selector 609, effect adjuster 601, and operation device 100 of the present disclosure that serves as an effect selector.

Figure 7:
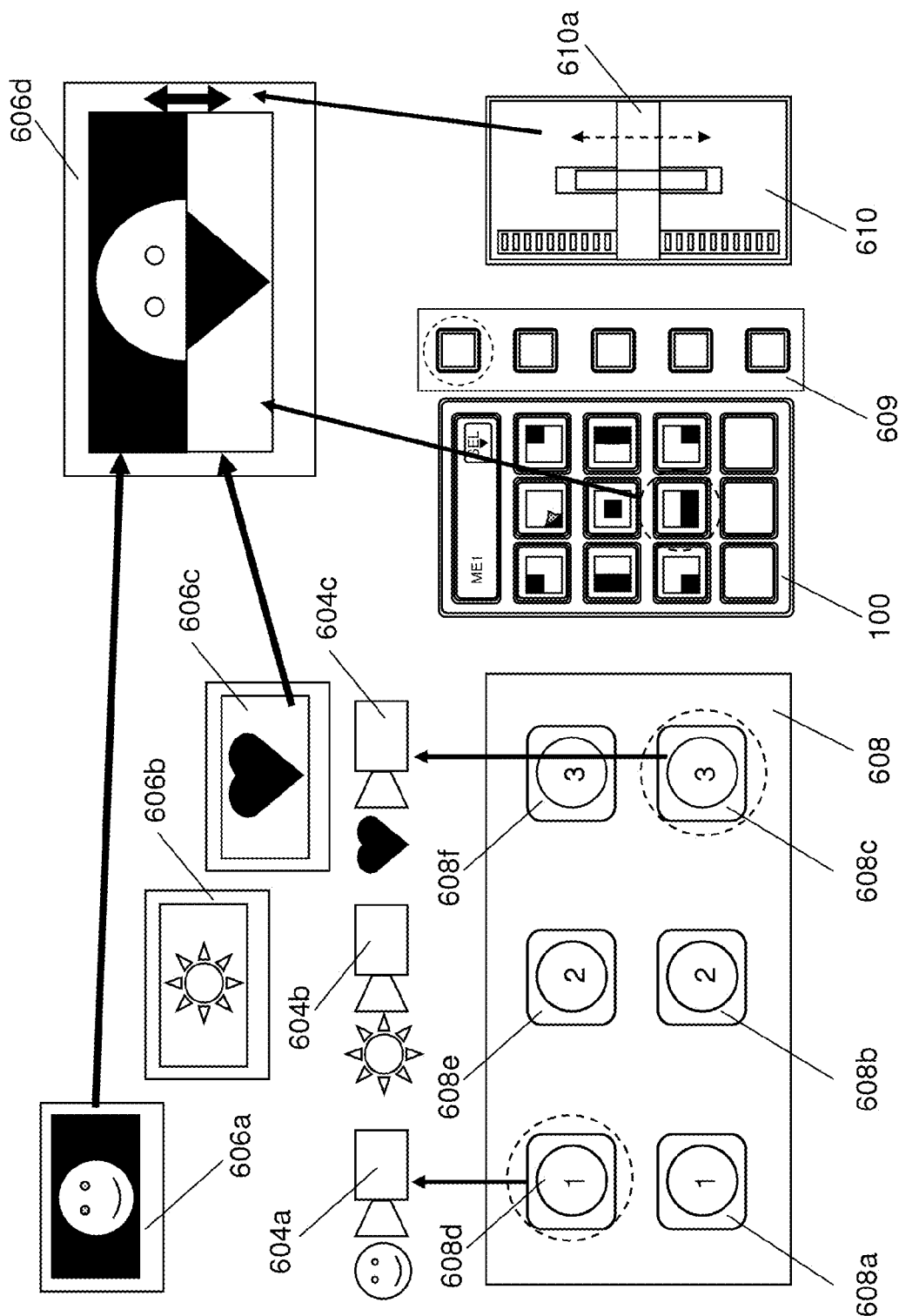
FIG. 7 is a view for illustrating the operation of a video image switching device according to the first exemplary embodiment.

FIG. 7 is a view for illustrating video image switching operation. Only the configurations that are used for explanation, in the video image switching system 600, are extracted. As an example of explanation of video image switching, operation of selecting a pattern of wipe that switches a screen so as to wipe a next video image from a video image being reproduced at the time of switching from a first video image to another video image is described.

A video image to be displayed is selected from video images that are photographed by cameras 604a, 604b and 604c. The video image that is photographed by camera 604a can be confirmed by monitor 606a for confirmation, the video image that is photographed by camera 604b can be confirmed by monitor 606b for confirmation, and the video image that is photographed by camera 604c can be confirmed by monitor 606c for confirmation. The selection of the video image is performed by video image operation part 608. Video image operation part 608 has selection buttons 608a, 608b, 608c, 608d, 608e and 608f. Selection buttons 608a and 608d are buttons that select the video image photographed by camera 604a, selection buttons 608b and 608e are buttons that select the video image photographed by camera 604b, and selection buttons 608c and 608f are buttons that select the video image photographed by camera 604c. Selection buttons 608a, 606b and 606c at a lower stage are buttons that select a video image to be first displayed, and selection buttons 608d, 606e and 606f at an upper stage are buttons that select a video image to be next displayed.

In the example of FIG. 7, the video image photographed by camera 604c is selected as a first video image, and the video image photographed by camera 604a is selected as a next video image. Selection button 608c is pressed, thereby selecting the video image photographed by camera 604c as the first video image. Then, selection button 608d is pressed, thereby selecting the video image photographed by camera 604a as the next video image. By video image selection processor 603, the video image photographed by camera 604c, which is the first video image, is displayed on monitor 606d for confirmation.

Operation of the selection of a pattern of wipe is now described. The pattern of wipe is selected by the use of effect content selector 609, and operation device 100 of the present disclosure that serves as an effect selector. Effect content selector 609 includes a plurality of buttons for the selection of effect contents. The buttons are a button that selects a pattern of wipe, a button that selects a pattern of a preset video image effect, a button that selects a previously stored video image, and the like.

Figure 8:
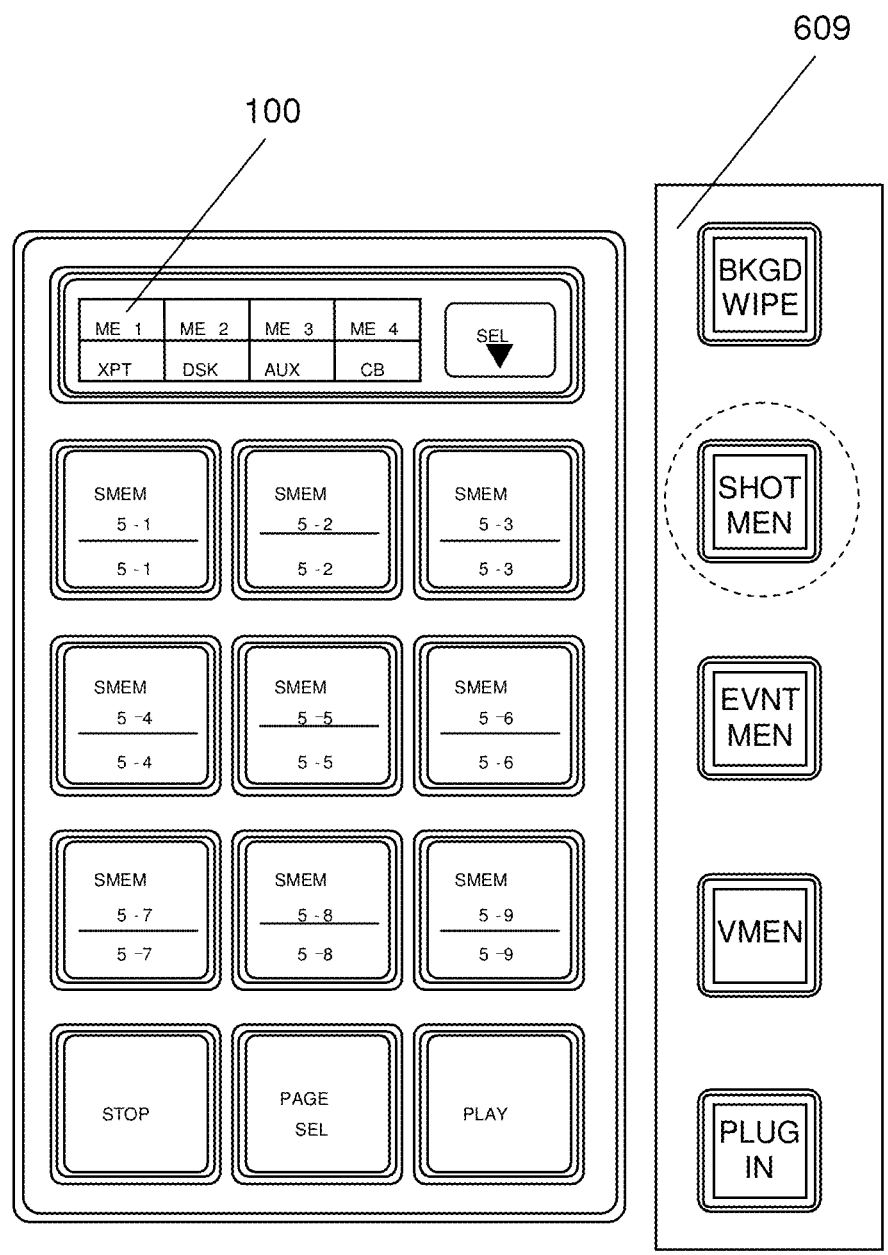
FIG. 8 is a view showing an example of the selection of the pattern of an effect content selector and an effect selector according to the first exemplary embodiment.
Figure 9:
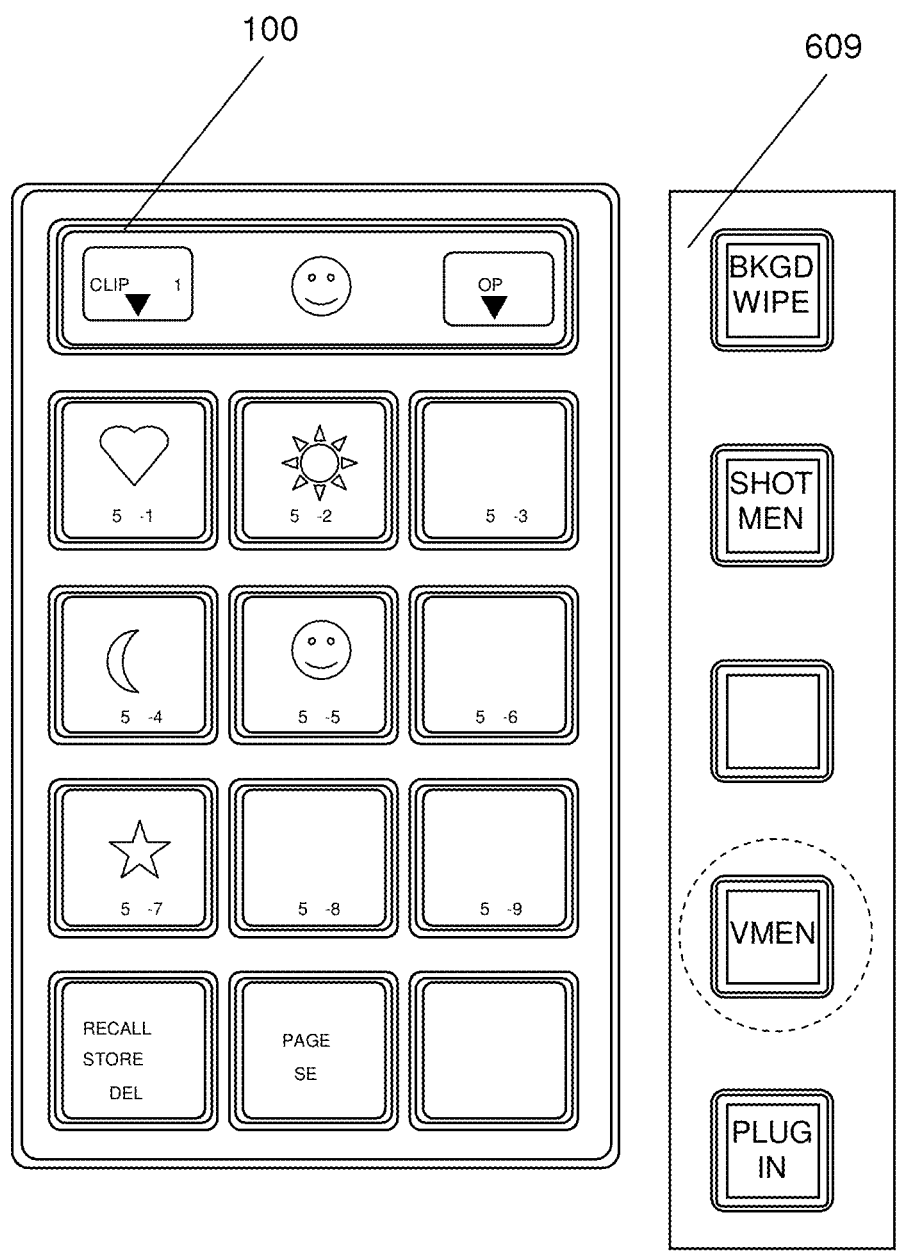
FIG. 9 is a view showing another example of the selection of the pattern of the effect content selector and the effect selector according to the first exemplary embodiment.
Figure 10:
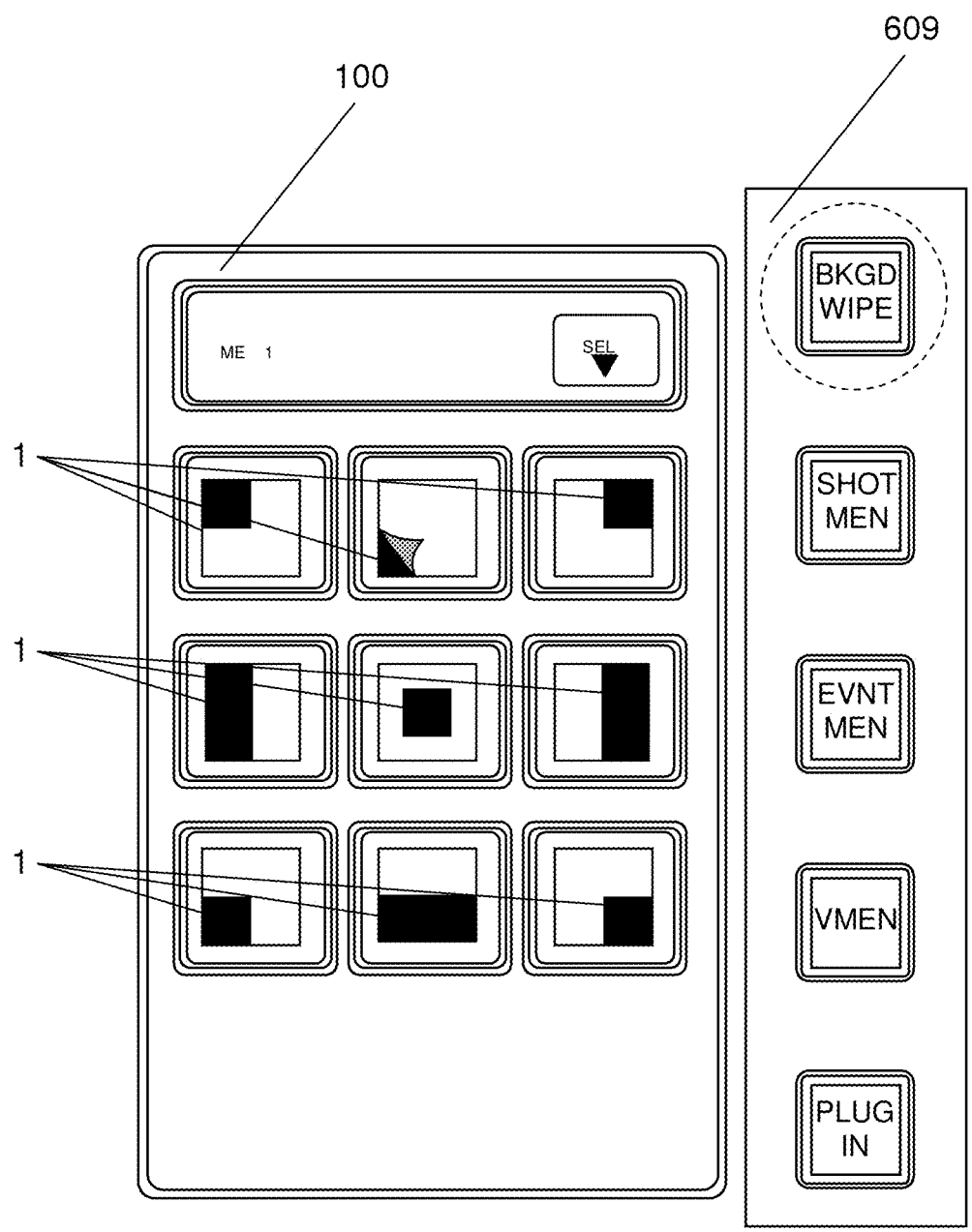
FIG. 10 is a view showing yet another example of the selection of the pattern of the effect content selector and the effect selector according to the first exemplary embodiment.

For example, as in an example of selection in FIG. 8, when the button that selects a pattern of a preset video image effect is pressed, the display of operation device 100 of the present disclosure that serves as an effect selector is changed to a selection screen of the preset video image effect. As in another example of selection in FIG. 9, when the button that selects a previously stored video image is pressed, the display of operation device 100 of the present disclosure that serves as an effect selector is changed to a selection screen of the previously stored video image. As in an example of selection in FIG. 10, when the button that selects a pattern of wipe is pressed, the display of operation device 100 of the present disclosure that serves as an effect selector is changed to the pattern of wipe. The pattern of wipe includes a pattern of wipe from an oblique direction from a corner of a screen, patterns of wipe from vertical and horizontal directions, a pattern of wipe from the center, and the like, and is displayed corresponding to each of buttons 1 of operation device 100.

Button 1 on which a pattern of wipe from above is displayed as the pattern of wipe is pressed. When button 1 is pressed, operation button 21 is warped, and tactile switch 60 is pressed. Tactile switch 60 is brought into an electrically closed state. When tactile switch 60 is brought into the closed state, tactile switch 60 is electrically connected to substrate 31. Then, information indicating that tactile switch 60 is in the electrically closed state is output to the outside via communication connector 110, and video image selection processor 603 receives the information indicating that tactile switch 60 is in the electrically closed state.

Operation of the switching of a video image by a selected wipe pattern is now described. Effect adjuster 601 includes lever 610a. Lever 610a is movable vertically, and can adjust the speed of wipe. Lever 610a is moved upward, thereby wiping the first video image from above to switch to the next video image. Monitor 606d for confirmation confirms the actual switching of the video image.

A process for switching of a photographed video image or a recorded video image by the pressing of various buttons is implemented by video image selection processor 603.

For the switching of a video image in video image switching system 600, it is an essential requirement that video image switching operation part 601 is operated by touch typing while a plurality of photographed video images or a plurality of video images for confirmation are viewed. Therefore, in a case of the utilization as video image switching operation part 601, the following is essential:
(1) each operation button can be physically determined.
(2) a click feeling can be obtained when a button is pressed.

Accordingly, operation device 100 of the present disclosure satisfies these requirements, and therefore it is optimum to utilize operation device 100 as the effect selector of video image switching operation part 601.

Other Exemplary Embodiment

In the first exemplary embodiment, operation device 100 is configured such that operation part 70 and display part 40 are integrated. However, configurations other than this configuration can be employed.

FIGS. 11A and 11B each are a configuration view of an operation switch according to another exemplary embodiment. As shown in FIGS. 11A and 11B, only operation part 71 configures operation switches. In place of display part 40, a display function of a smartphone, a tablet or the like is alternatively used. In FIGS. 11A and 11B, operation part 71 is configured by partition frame member 10, operation button member 20, and switch substrate 32. Information terminal 90 is used as a display part. Information terminal 90 includes radio communication module 131, antenna 141, and communication connector 114. Partition frame member 10 and operation button member 20 are similar to those of the first exemplary embodiment, and therefore description thereof is omitted. Switch substrate 32 further has radio communication module 130 and antenna 140 compared to switch substrate 30 described in the first exemplary embodiment. Radio communication module 130 is, for example, a bluetooth (registered trademark) module.

Information terminal 90 is mounted with a dedicated application that has an image division display function of dividing the display part of information terminal 90 into thirteen display frames to display an image, and an image rewrite function of individually rewriting the display of thirteen display frames.

FIG. 11A shows a configuration of information transmission between operation part 71 and information terminal 90 by radio. First, operation part 71 is set on information terminal 90. Then, the change operation of the display contents of desired opening 50 is performed as follows.

First, when a user presses desired operation button 21, radio communication module 130 transmits the pressed information from antenna 140 by radio. For the pressed information that is received by antenna 141 and radio communication module 131 of information terminal 90, the dedicated application performs a process according to a pressed position. As a result, information terminal 90 switches the display of opening 50 corresponding to the pressed operation button 21.

The user obtains a click feeling or a key stroke that tactile switch 60 has, under the pressing of operation button 21.

Then, when a finger is released from operation button 21 from the state where operation button 21 is pressed, operation button 21 is returned to a state before the pressed state, with repulsion force by elasticity that operation button 21 has.

FIG. 11B shows a case where information is transmitted between operation part 71 and information terminal 90 by use of communication cable 122 connected to communication connectors 110 and 114. The change operation of the display contents of opening 50 in this case is similar to the aforementioned contents.

As described above, the operation switch according to this exemplary embodiment is used by combination with information terminal 90, and it is possible to configure operation buttons 21 that are arranged in openings 50 definitely separated visually and tactilely, by the provision of opaque partition frame member 10 on the display part of information terminal 90. Additionally, the operation switch enables the bodily sensation of a click feeling that tactile switch 60 itself has, via operation button 21, and can return to a state before a pressed state by button returning force after the pressing operation of operation button 21.

In the first exemplary embodiment, switch substrate 30 of operation device 100 is mounted with communication connector 110. However, in place of this, a radio communication connector and a radio communication module that allow the transmission of information to the outside by use of a radio communication system may be mounted. Alternatively, the radio communication connector and the radio communication module may be mounted in addition to communication connector 110.

In the other exemplary embodiment, switch substrate 32 of operation part 71 is mounted with communication connector 110, radio communication module 130, and antenna 140. However, either communication connector 110, or radio communication module 130 and antenna 140 may be mounted.

The present disclosure switches the display of a display part by the pressing operation of a transparent operation button, and therefore can be utilized in various operation equipment such as information equipment, FA equipment, medical operation equipment, a smartphone, and a tablet.

What is claimed is:
1. An operation device comprising:
a display part;
a partition frame member arranged on the display part, and configured to divide the display part into a plurality of display areas;
an operation button member having transparent operation buttons arranged over the respective display areas and support portions, the operation buttons and the support portions being integrally formed as one piece molded member made of one material, each of the operation buttons being connected to the support portion at only one side and being configured to be able to deform in a pressing direction at one side connected to one of the support portions as a fulcrum;
switch parts arranged under the operation button member, and pressed by pressing of the operation buttons; and
an output part configured to output information indicating whether or not the switch parts are pressed.

2. The operation device according to claim 1, wherein the switch parts are tactile switches.

3. The operation device according to claim 1, wherein the operation buttons are separated from each other by a frame of the partition frame member when viewed from above.

4. The operation device according to claim 1, wherein the operation button member is disposed between the display part and the partition frame member.

5. The operation device according to claim 1, wherein the only one side of each of the operation buttons is connected to the support portions as the fulcrum, and other sides of each of the operation buttons are surrounded by the support portions with a space between the other sides and the support portions.

6. The operation device according to claim 1, wherein a thickness of the operation buttons is greater than a thickness of the support portions.

7. An operation switch comprising:
a partition frame member having openings;
an operation button member having transparent operation buttons and support portions, the operation buttons respectively corresponding to the openings, the operation buttons and the support portions being integrally formed as one piece molded member made of one material, each of the operation buttons being connected to the support portion at only one side and being configured to be able to deform the operation buttons in a pressing direction at one side connected to one of the support portions as a fulcrum;
switch parts arranged under the operation button member, and pressed by pressing of the operation buttons; and
an output part configured to output information indicating whether or not the switch parts are pressed.

8. The operation switch according to claim 7, wherein the operation buttons are separated from each other by a frame of the partition frame member when viewed from above.

9. The operation switch according to claim 7, wherein the operation button member is disposed between the display part and the partition frame member.

10. The operation device according to claim 7, wherein the only one side of each of the operation buttons is connected to the support portions as the fulcrum, and other sides of each of the operation buttons are surrounded by the support portions with a space between the other sides and the support portions.

11. The operation switch according to claim 7, wherein a thickness of the operation buttons is greater than a thickness of the support portions.

* * * * *